United States Patent
Van Baak

(10) Patent No.: US 10,177,396 B2
(45) Date of Patent: Jan. 8, 2019

(54) ELECTRICITY GENERATION

(71) Applicant: Fujifilm Manufacturing Europe BV, Tilburg (NL)

(72) Inventor: Willem Van Baak, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 584 days.

(21) Appl. No.: 14/646,191

(22) PCT Filed: Nov. 18, 2013

(86) PCT No.: PCT/GB2013/053037
§ 371 (c)(1),
(2) Date: May 20, 2015

(87) PCT Pub. No.: WO2014/080188
PCT Pub. Date: May 30, 2014

(65) Prior Publication Data
US 2015/0311558 A1    Oct. 29, 2015

(30) Foreign Application Priority Data
Nov. 20, 2012 (GB) .................................. 1220832.8

(51) Int. Cl.
*H01M 8/10* (2016.01)
*H01M 8/18* (2006.01)
(Continued)

(52) U.S. Cl.
CPC ......... *H01M 8/227* (2013.01); *H01M 8/1009* (2013.01); *H01M 8/18* (2013.01)

(58) Field of Classification Search
None
See application file for complete search history.

(56) References Cited

U.S. PATENT DOCUMENTS 4,171,409 A * 10/1979 Loeb ..................... H01M 8/227
                                                              290/1 R
8,236,158 B2    8/2012 Sparrow et al.
(Continued)

FOREIGN PATENT DOCUMENTS

CN        102610844 A    7/2012
WO    2007094659 A1    8/2007
(Continued)

OTHER PUBLICATIONS

Turek et al, Renewable energy by reverse electrodialysis, Apr. 4, 2006, Desalination, 2005, 67-74.*
(Continued)

*Primary Examiner* — Daniel S Gatewood
(74) *Attorney, Agent, or Firm* — Banner & Witcoff, Ltd.

(57) ABSTRACT

A method for generating electricity comprising the steps:
(A) passing a concentrated ionic solution through a first pathway in a reverse electrodialysis unit comprising a membrane stack having electrodes and alternating cation and anion exchange membranes; and
(B) passing a dilute ionic solution through a second pathway in said reverse electrodialysis unit, whereby solute from the concentrated solution in the first pathway passes through the membranes to the dilute solution in the second pathway, thereby generating electricity;
wherein the concentration of solute in the dilute ionic solution as it enters the reverse electrodialysis unit is at least 0.03 mol/l.

11 Claims, 1 Drawing Sheet

(51) Int. Cl.
    *H01M 8/22*           (2006.01)
    *H01M 8/1009*      (2016.01)

(56)                 References Cited

U.S. PATENT DOCUMENTS

| | | | |
|---|---|---|---|
| 8,795,525 | B2 | 8/2014 | McGinnis et al. |
| 2012/0248032 | A1* | 10/2012 | Van Berchum .......... B01J 39/20 |
| | | | 210/500.38 |
| 2012/0279861 | A1 | 11/2012 | Sparrow et al. |
| 2012/0292187 | A1* | 11/2012 | Kim ...................... B01D 61/44 |
| | | | 204/527 |
| 2012/0298584 | A1 | 11/2012 | Lipscomb et al. |
| 2013/0292331 | A1 | 11/2013 | Lipscomb et al. |
| 2014/0026567 | A1 | 1/2014 | Paripati et al. |
| 2014/0305863 | A1 | 10/2014 | Van Engelen |

FOREIGN PATENT DOCUMENTS

| | | | | |
|---|---|---|---|---|
| WO | 2011050473 | A1 | 5/2011 | |
| WO | WO 2012040335 | A2 * | 3/2012 | ........... B01D 61/002 |
| WO | 2012158941 | A2 | 11/2012 | |

OTHER PUBLICATIONS

May 26, 2015 (WO) International Preliminary Report on Patentability—App. PCT/GB2013/053037.
Logan Bruce E., et al , Nature, vol. 488, Aug. 16, 2012, pp. 313-319.
Turek et al. Desalination, Jan. 31, 2007 Elsevier, Amsterdam, NL—ISSN 0011-9164, vol. 205, Nr:1-3, pp. 67-74.

* cited by examiner

ELECTRICITY GENERATION

This invention relates to a method and apparatus for generating electricity using reverse electrodialysis.

As is known, electricity may be generated from the free energy of mixing of two ionic solutions by reverse electrodialysis. This technique uses a reverse electrodialysis unit comprising a membrane stack having alternating cation and anion exchange membranes, an electrode at each end of the stack, a first pathway through the reverse electrodialysis unit for a concentrated ionic solution, and a second pathway through the reverse electrodialysis unit for a dilute ionic solution. When the concentrated ionic solution is introduced into the first pathway, and the dilute ionic solution is introduced into the second pathway, solute from the concentrated solution in the first pathway passes through the membranes to the dilute solution in the second pathway, this being accompanied by the generation of an output electricity across the electrodes at the ends of the stack. The voltage generated by the concentration difference across each pair of membranes is low, but this voltage is multiplied by increasing the number of alternating cation and anion exchange membranes to separate the two solutions in the membrane stack.

The above described reverse electrodialysis (hereinafter sometimes called "RED") technique is of interest for the production of electricity in an environmentally-friendly way. However, RED often requires one or both of the concentrated and dilute feed solutions (hereinafter sometimes called "mixing pairs") to be continually replenished. RED plants having this replenishment requirement have to be located close to ready sources of salty and fresh/brackish water, e.g. near the Dead Sea where, sea water and relatively fresh river water are in close proximity. In addition, RED plants having this replenishment requirement involve problems in the transport of the feed solutions to the plant, and in the disposal of the mixed solution (hereinafter sometimes called "spent brine") exiting from the RED unit.

Furthermore, there is also a desire to increase the power output (W/m$^2$) of RED plants to make them more competitive versus other sources of electricity.

An object of the present invention is to provide a method and apparatus for generating electricity by reverse electrodialysis.

According to a first aspect of the present invention, there is provided a method for generating electricity comprising the steps:
(A) passing a concentrated ionic solution through a first pathway in a reverse electrodialysis unit comprising a membrane stack having electrodes and alternating cation and anion exchange membranes; and
(B) passing a dilute ionic solution through a second pathway in said reverse electrodialysis unit, whereby solute from the concentrated solution in the first pathway passes through the membranes to the dilute solution in the second pathway, thereby generating electricity;
wherein the concentration of solute in the dilute ionic solution as it enters the reverse electrodialysis unit is at least 0.03 mol/l.

The method preferably further comprises the step (C) of regenerating the concentrated and dilute ionic solutions from the solutions exiting from the reverse electrodialysis unit and recycling said regenerated concentrated and dilute solutions back through said respective first and second pathways in the reverse electrodialysis unit. In this way, the method may be operated as a continuous process.

In a preferred embodiment, the concentrated ionic solution passing through the first pathway has a higher temperature than the dilute ionic solution passing through a second pathway. This embodiment and device for performing it can be thought of as a 'heat-engine', i.e., a man-made device which makes it possible for a working substance to undergo a cyclic process for converting heat into electricity. This 'RED heat engine' requires an input of heat and it produces an output of electricity, with little or no waste stream.

The method is not restricted to locations where there are large quantities of suitable mixing pairs in close proximity, i.e. concentrated and dilute ionic solutions. On the contrary, the present process can be used much more widely. In addition, the above-described method obviates the problems of transporting mixing pairs to the RED unit, and of disposing of spent brine.

An additional advantage of regenerating the concentrated and dilute ionic solutions is that fouling by contaminants from the feed streams can be prevented.

Preferably the ionic solutions are not obtained directly from natural sources, e.g. from a river water, ground water or sea water. Further due to the closed character of the system the choice of solute(s) is not limited to what is available from external sources but can be optimized to obtain a higher electrical energy production.

The heat source which may optionally be used to heat the concentrated ionic solution is not particularly limited and it includes, for example, solar energy and unwanted and low grade heat, e.g. waste heat from power plants or the heat generated in industrial cooling towers or manufacturing process. The same heat source can also be used in optional regeneration step (C) to evaporate liquid (e.g. water) from the solution(s) exiting the RED unit or from a mixture comprising one or both of such solutions.

Since step (C) can take place at relatively low temperature differences, the process is particularly useful where low temperature heat sources are available, such as solar energy, geothermal energy, and waste heat.

The regeneration which occurs in optional step (C) may be done by a number of techniques, with thermal regeneration being preferred.

Preferably the process is performed without mixing of the (raw) streams exiting the reverse electrodialysis unit. For example, one may pass (parts of) one or both of the streams exiting the reverse electrodialysis unit into regeneration unit(s) which heat the stream(s), thereby evaporating liquid therefrom and creating an ion-free liquid (i.e. a liquid having a very low solute content) and a concentrate. The ion-free liquid and concentrate may then be mixed with streams exiting the reverse electrodialysis unit to change their solute content, thereby regenerating the concentrated ionic solution and the dilute ionic solution.

Thermal regeneration step preferably comprises:
(i) evaporation of liquid (e.g. water) from one or both of the solution(s) exiting the RED unit and condensation of the evaporated liquid to give an ion-free liquid and a concentrate;
(ii) mixing of the ion-free liquid with one or both of the solution(s) exiting the RED unit, thereby regenerating the dilute ionic solution; and
(iii) mixing of the concentrate with one or both of the solution(s) exiting the RED unit, thereby regenerating the concentrated ionic solution.

For efficiency reasons, in step (ii) it is preferred that ion-free liquid is mixed with the solution exiting the RED unit which has the lowest solute content (i.e. the solution derived from the dilute ionic solution). Similarly, in step (iii)

it is preferred that the concentrate is mixed with the solution exiting the RED unit which has the highest solute content (i.e. the solution derived from the concentrated ionic solution).

Typically the electrodes are located at each end of the stack.

Further features and advantages of the invention will be apparent from the description below.

BRIEF DESCRIPTION OF THE DRAWING

The invention is herein described, somewhat diagrammatically, and by way of example only, with reference to the accompanying drawing, wherein.

DESCRIPTION OF PREFERRED EMBODIMENTS

Figure 1:
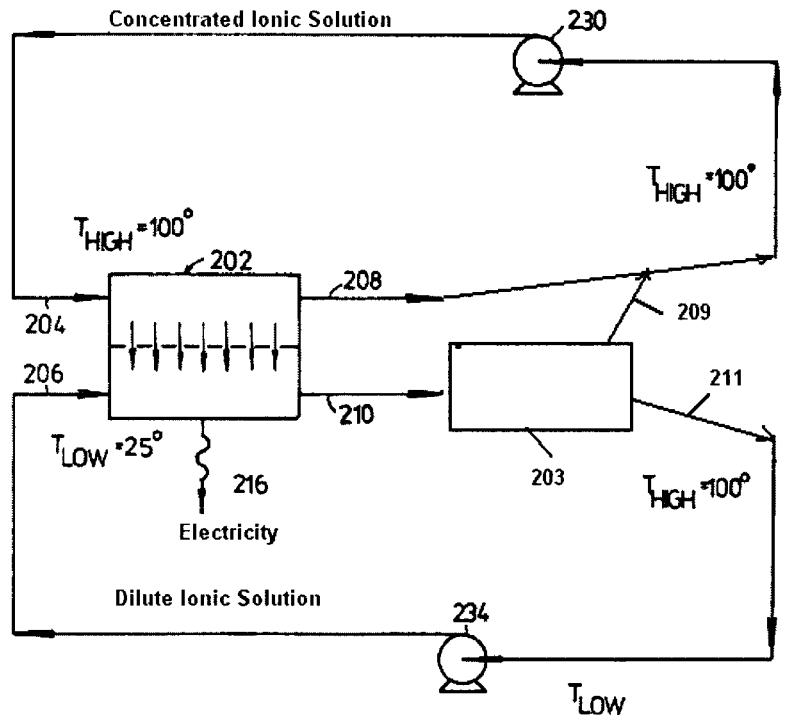
FIG. 1 illustrates one embodiment of the present invention.

Referring to FIG. 1, the concentrated ionic solution enters inlet 204 of the RED unit 202 and exits, with a somewhat lower ionic concentration, via outlet 208; whereas the dilute ionic solution enters unit 202 via inlet 206 and exits, with a somewhat higher ionic concentration, via outlet 210. The exiting solution 210 enters the optional regeneration unit 203 comprising a distillation unit receiving heat from a heat source. The distillation unit separates the solution derived from outlet 210 into an ion-free liquid and a concentrate. The ion-free liquid is mixed with liquid derived from outlet 210, thereby regenerating the dilute ionic solution which exits the regeneration unit via outlet 211 and is pumped back to inlet 206 via pump 234. Meanwhile the concentrate created in regeneration unit 203 exits via outlet 209 and is mixed with the liquid derived from outlet 208, thereby regenerating the concentrated ionic solution which is pumped back to inlet 204 via pump 230. In FIG. 1 the power output of the process is enhanced by making the concentrated ionic solution hotter than the dilute ionic solution, although this is a preferred but not an essential aspect of the present invention.

The electrical energy generated across the electrodes in the RED unit 202 is outputted at 216.

FIG. 1 includes legends illustrating an example of operating conditions.

In an alternative embodiment the dilute ionic solution is hotter than the concentrated ionic solution. A hot dilute ionic solution has a lower electrical resistance than a cold dilute ionic solution and can enhance the power output of the RED unit.

In a further embodiment, both the concentrated and the dilute ionic solution are 'hot', e.g. having a temperature of at least 40° C. At such higher temperatures generally the solubility of solute(s) and the ion transport through the membranes are higher than for cold solutions. Especially when heat is applied for the regeneration step it is economically beneficial to perform the method such that one or both of the solutions are at a high temperature, e.g. higher than 40° C. Within the RED stack the solutions likely will reach thermal equilibrium rapidly.

Because of the high volumetric latent heat of vaporization of water, the use of water increases the heat required for producing electricity, thereby decreasing the thermal efficiency of the process. For this reason, it may be desirable for the ionic solutions to comprise an organic solvent having a lower volumetric latent heat of vaporization than water (either instead of or in addition to water), especially a water-miscible organic solvent, particularly those having a boiling point below 100° C., e.g. methyl and/or ethyl alcohol. Examples of the solute that could be used with a polar organic solvent include ferric chloride and/or sodium nitrate.

The solute typically comprises one or more salts. Preferred salts have a high solubility in the liquid medium in which they are dissolved. In this specification, the terms "solute" and "salt" are often used interchangeably.

The ionic solutions typically comprise solute (i.e. one or more salts), water and optionally a water-miscible organic solvent.

Preferred salts comprise a cation selected from sodium, potassium, lithium, caesium, rubidium and/or ammonium, i.e. the salt comprises a sodium, potassium, lithium, caesium, rubidium and/or ammonium salt. The salt preferably comprises an anion selected from azide, bromide, carbonate, chloride, chlorate, fluoride, iodide, hydrogen carbonate, nitrate, nitrite, selenide, perchlorate, thiocyanate, thiosulphate, acetate and/or formate. More preferably the salt comprises an anion selected from azide, bromide, carbonate, chloride, fluoride, iodide, nitrate, nitrite, perchlorate, thiocyanate, thiosulphate, acetate and/or formate.

As examples of sodium salts there may be mentioned sodium formate, acetate, azide, chloride, bromide, iodide, carbonate, chlorate, perchlorate, hydrogen carbonate, nitrate, nitrite, thiocyanate, thiosulphate and mixtures comprising two or more thereof.

As examples of potassium salts there may be mentioned potassium formate, acetate, fluoride, chloride, bromide, iodide, azide, carbonate, hydrogen carbonate, perchlorate, nitrate, nitrite, phosphate, thiocyanate, thiosulphate and mixtures comprising two or more thereof.

As examples of lithium salts there may be mentioned lithium formate, acetate, chloride, bromide, iodide, azide, bromate, chlorate, perchlorate, nitrate, nitrite, selenide, thiocyanate and mixtures comprising two or more thereof.

As examples of caesium salts there may be mentioned caesium formate, acetate, fluoride, chloride, bromide, iodide, azide, carbonate, hydrogen carbonate, perchlorate, nitrate, nitrite, thiocyanate and mixtures comprising two or more thereof.

As examples of rubidium salts there may be mentioned rubidium formate, acetate, fluoride, chloride, bromide, iodide, carbonate, hydrogen carbonate, nitrate, nitrite, thiocyanate and mixtures comprising two or more thereof.

As examples of ammonium salts there may be mentioned ammonium formate, acetate, fluoride, chloride, bromide, iodide, carbonate, hydrogen carbonate, chlorate, sulphate, hydrogen sulphate, nitrate, nitrite, thiocyanate, thiosulphate and mixtures comprising two or more thereof.

The ionic solutions comprise one or more than one salt (as the solute), e.g. two or more of the foregoing salts. In a preferred embodiment one or both of the ionic solutions comprise water and at least 0.02 mol/l of a solute other than sodium chloride.

Preferred salts comprise a cation which has an (unhydrated) ionic radius larger than 0.1 nm, more preferably larger than 0.13 nm. Suitable cations include sodium (ionic radius 0.10 nm) potassium (ionic radius 0.14 nm), rubidium (ionic radius 0.15 nm), caesium (ionic radius 0.17 nm) and ammonium (ionic radius 0.15 nm).

Preferred salts comprise an anion which has an (unhydrated) ionic radius larger 0.15 nm, more preferably larger than 0.18 nm. Suitable anions include chloride (ionic radius 0.18 nm), bromide (ionic radius 0.20 nm), iodide (ionic radius 0.22 nm), nitrate (ionic radius 0.19 nm), nitrite (ionic radius 0.19 nm), thiocyanate, hydrogen carbonate, formate and acetate.

The salt(s) used in the concentrated ionic solution may be identical to or different from the salt(s) used in the diluted ionic solution second stream, although typically the salts present in both solutions will become the same as the method continues due to the potential mixing of the outlet streams.

The ionic solutions preferably comprise sodium nitrate, sodium nitrite, lithium nitrate, lithium nitrite, lithium acetate, potassium formate, potassium acetate, potassium nitrite, potassium thiocyanate, ammonium formate, ammonium acetate, ammonium nitrate and/or ammonium thiocyanate.

When the ionic solutions comprise more than one salt, the number of moles/liter (mol/l) of solute is the total for all of the salts present. For example, if 1 liter of an ionic solution contains 0.1 mol of salt A and 0.15 mol of salt B then the ionic solution contains (0.1+0.15 mol/l) solute=0.25 mol/l solute. The solvent preferably comprises water and optionally a water miscible (organic) solvent.

Preferably the ionic solutions comprise a salt which has solubility in water at 20° C. ($S_{20C}$) of at least 4 mol/kg of water, more preferably at least 5 mol/kg, especially at least 8 mol/kg, more especially at least 10 mol/kg of water.

The values of $S_{20C}$ and $S_{60C}$ for various salts are shown in Table 1 below:

TABLE 1

| Salt | Formula | $S_{20\,C.}$ (mol/kg water) | $S_{60\,C.}$ (mol/kg water) |
|---|---|---|---|
| Sodium acetate | NaC$_2$H$_3$O$_2$ | 5.7 | 17.0 |
| Sodium bromide | NaBr | 8.8 | 11.5 |
| Sodium chlorate | NaClO$_3$ | 9.0 | 12.9 |
| Sodium chloride | NaCl | 6.1 | 6.3 |
| Sodium formate | NaHCO$_2$ | 11.9 | 17.9 |
| Sodium hydrogen carbonate | NaHCO$_3$ | 1.1 | 1.9 |
| Sodium iodide | NaI | 11.9 | 17.1 |
| Sodium nitrate | NaNO$_3$ | 10.3 | 14.4 |
| Sodium nitrite | NaNO$_2$ | 11.7 | 16.1 |
| Sodium perchlorate | NaClO$_4$ | 16.4 | 23.5 |
| Sodium thiosulphate | Na$_2$S$_2$O$_3$ | 4.6 | 5.3 |
| Potassium acetate | KC$_2$H$_3$O$_2$ | 26.1 | 35.7 |
| Potassium azide | KN$_3$ | 5.6 | |
| Potassium bromide | KBr | 5.5 | 7.2 |
| Potassium carbonate | K$_2$CO$_3$ | 11.2 | 12.8 |
| Potassium chloride | KCl | 4.6 | 6.1 |
| Potassium formate | KHCO$_2$ | 40.1 | 56.1 |
| Potassium fluoride | KF | 16.4 | 24.5 |
| Potassium hydrogen carbonate | KHCO$_3$ | 3.4 | 6.6 |
| Potassium iodide | KI | 8.7 | 10.6 |
| Potassium nitrate | KNO$_3$ | 4.6 | 10.2 |
| Potassium nitrite | KNO$_2$ | 36.0 | 40.9 |
| Potassium thiocyanate | KSCN | 23.0 | 38.4 |
| Potassium thiosulphate | K$_2$S$_2$O$_3$ | 8.2 | 12.5 |
| Ammonium acetate | NH$_4$C$_2$H$_3$O$_2$ | 18.6 | 40.4 |
| Ammonium bromide | NH$_4$Br | 7.8 | 11.0 |
| Ammonium chloride | NH$_4$Cl | 7.0 | 10.3 |
| Ammonium formate | NH$_4$HCO$_2$ | 22.7 | 49.4 |
| Ammonium hydrogen carbonate | NH$_4$HCO$_3$ | 2.7 | 7.5 |
| Ammonium iodide | NH$_4$I | 11.9 | 14.4 |
| Ammonium nitrate | NH$_4$NO$_3$ | 24.0 | 52.6 |
| Ammonium thiocyanate | NH$_4$SCN | 22.3 | 45.5 |
| Ammonium thiosulphate | (NH$_4$)$_2$S$_2$O$_3$ | 11.7 | |
| Caesium acetate | CsC$_2$H$_3$O$_2$ | 52.6 | |
| Caesium azide | CsN$_3$ | 17.5 | |
| Caesium bromide | CsBr | 5.1 | |
| Caesium chloride | CsCl | 11.1 | 13.6 |
| Caesium fluoride | CsF | 21.2 | |
| Caesium formate | CsHCO$_2$ | 25.3 | |
| Caesium iodide | CsI | 2.9 | 5.8 |

TABLE 1-continued

| Salt | Formula | $S_{20\,C.}$ (mol/kg water) | $S_{60\,C.}$ (mol/kg water) |
|---|---|---|---|
| Caesium nitrate | CsNO$_3$ | 1.2 | 4.3 |
| Rubidium bromide | RbBr | 6.5 | 9.5 |
| Rubidium fluoride | RbF | 28.7 | |
| Rubidium formate | RbHCO$_2$ | 42.5 | 69.0 |
| Rubidium hydrogen carbonate | RbHCO$_3$ | 7.5 | |
| Rubidium iodide | RbI | 6.8 | |
| Rubidium nitrate | RbNO3 | 3.6 | 13.6 |
| Lithium acetate | LiC$_2$H$_3$O$_2$ | 6.2 | |
| Lithium azide | LiN$_3$ | 13.7 | 17.7 |
| Lithium bromide | LiBr | 18.4 | 25.6 |
| Lithium chloride | LiCl | 19.6 | 23.2 |
| Lithium chlorate | LiClO$_3$ | 41.1 | 85.9 |
| Lithium formate | LiHCO$_2$ | 7.6 | 12.4 |
| Lithium iodide | LiI | 12.3 | 15.1 |
| Lithium nitrate | LiNO$_3$ | 10.2 | 25.4 |
| Lithium nitrite | LiNO$_2$ | 18.3 | 33.4 |
| Lithium thiocyanate | LiSCN | 17.5 | |

The total concentration of solute (i.e. salts) in the concentrated ionic solution as it enters the reverse electrodialysis unit is preferably 0.6 to 100 mol/l, more preferably 1.5 to 80 mol/l, especially 3 to 75 mol/l.

The total concentration of solute (i.e. salts) in the dilute ionic solution as it enters the reverse electrodialysis unit is preferably 0.03 to 4 mol/l, more preferably 0.05 to 3 mol/kg solvent, especially 0.06 to 2.5 mol/l, more especially 0.08 to 2 mol/l.

In a preferred embodiment the concentrated ionic solution and the dilute ionic solution each independently comprise sodium nitrate, sodium nitrite, lithium nitrate, lithium nitrite, lithium acetate, potassium formate, potassium acetate, potassium nitrite, potassium thiocyanate, ammonium formate, ammonium acetate, ammonium nitrate and/or ammonium thiocyanate. Preferably the ionic solutions comprise at least 0.02 mol/l of solute. Preferably the identity of the solute present in the concentrated ionic solution and the dilute ionic solution are substantially the same.

Preferably the method is performed such that the following equation is satisfied:

$$S1/S2 > Y$$

wherein:
S1 is the concentration of solute (e.g. salt) in mol/l in the concentrated ionic solution as it enters the reverse electrodialysis unit;
S2 is the concentration of solute (e.g. salt) in mol/l in the dilute ionic solution as it enters the reverse electrodialysis unit; and
Y is at least 30.

Preferably Y is at least 40, more preferably at least 50, especially at least 60, more especially at least 80, 100 or 120. Preferably Y is less than 1000, more preferably less than 200, especially less than 150.

The temperature of the concentrated ionic solution as it enters the reverse electrodialysis unit is preferably 20 to 200° C., more preferably 30 to 150° C., especially 50 to 120° C.

The temperature of the dilute ionic solution as it enters the reverse electrodialysis unit is preferably 0 to 40° C., more preferably 1 to 35° C., especially 5 to 30° C.

As the ionic solutions enter the reverse electrodialysis unit, it is preferred that the concentrated ionic solution is 5 to 200° C. hotter than the dilute ionic solution, more preferably 10 to 149° C., especially 11 to 100° C., more especially 12 to 75° C. hotter than the dilute ionic solution.

In a preferred embodiment, Y is at least 40 (e.g. 40 to 200), $S_{20C}$ is at least 4 mol/kg of water.

In another preferred embodiment, Y is at least 40 (e.g. 40 to 200), $S_{20C}$ is at least 8 mol/kg of water.

In another preferred embodiment, Y is 50 to 150, $S_{20C}$ is at least 5 mol/kg of water.

In another preferred embodiment, Y is 50 to 150, $S_{20C}$ is at least 10 mol/kg of water.

In another preferred embodiment, Y is at least 40 (e.g. 40 to 200), the concentrated ionic solution and the dilute ionic solution each independently comprise sodium bromide, sodium chlorate, sodium iodide, sodium nitrate, sodium nitrite, sodium formate, sodium acetate, sodium perchlorate, potassium fluoride, potassium iodide, potassium formate, potassium acetate, potassium carbonate, potassium nitrite, potassium thiocyanate, lithium nitrate, lithium nitrite, lithium acetate, ammonium formate, ammonium acetate, ammonium chloride, ammonium bromide, ammonium iodide, ammonium nitrate, ammonium thiosulphate and/or ammonium thiocyanate and, as the ionic solutions enter the reverse electrodialysis unit, the concentrated ionic solution is 5 to 200° C. hotter than the dilute ionic solution.

In another preferred embodiment, Y is 40 to 200 and the concentrated ionic solution and the dilute ionic solution each independently comprise potassium formate, potassium acetate, potassium nitrite, potassium thiocyanate, ammonium formate, ammonium acetate, ammonium nitrate and/or ammonium thiocyanate.

In another preferred embodiment, Y is 50 to 150 and the concentrated ionic solution and the dilute ionic solution each independently comprise potassium formate, potassium acetate, potassium nitrite, potassium thiocyanate, ammonium formate, ammonium acetate, ammonium nitrate and/or ammonium thiocyanate.

In another preferred embodiment, Y is 40 to 200, $S_{20C}$ is at least 4 mol/kg of water and, as the ionic solutions enter the reverse electrodialysis unit, the concentrated ionic solution is 5 to 200° C. hotter than the dilute ionic solution.

In another preferred embodiment, Y is 50 to 150, $S_{20C}$ is at least 5 mol/kg of water and, as the ionic solutions enter the reverse electrodialysis unit, the concentrated ionic solution is 10 to 149° C. hotter than the dilute ionic solution.

In another preferred embodiment, Y is 50 to 150, $S_{20C}$ is at least 10 mol/kg of water and, as the ionic solutions enter the reverse electrodialysis unit, the concentrated ionic solution is 11 to 100° C. hotter than the dilute ionic solution.

In another preferred embodiment, Y is 40 to 200, the concentrated ionic solution and the dilute ionic solution each independently comprise potassium formate, potassium acetate, potassium nitrite, potassium thiocyanate, ammonium formate, ammonium acetate, ammonium nitrate and/or ammonium thiocyanate and, as the ionic solutions enter the reverse electrodialysis unit, the concentrated ionic solution is 5 to 200° C. hotter than the dilute ionic solution.

In another preferred embodiment, Y is 50 to 150, the concentrated ionic solution and the dilute ionic solution each independently comprise potassium formate, potassium acetate, potassium nitrite, potassium thiocyanate, ammonium formate, ammonium acetate, ammonium nitrate and/or ammonium thiocyanate and, as the ionic solutions enter the reverse electrodialysis unit, the concentrated ionic solution is 12 to 75° C. hotter than the dilute ionic solution.

In another preferred embodiment, Y is at least 40 (e.g. 40 to 200), the concentrated ionic solution and the dilute ionic solution each independently comprise sodium bromide, sodium chlorate, sodium iodide, sodium nitrate, sodium nitrite, sodium formate, sodium acetate, sodium perchlorate, potassium fluoride, potassium iodide, potassium formate, potassium acetate, potassium carbonate, potassium nitrite, potassium thiocyanate, lithium nitrate, lithium nitrite, lithium acetate, ammonium formate, ammonium acetate, ammonium chloride, ammonium bromide, ammonium iodide, ammonium nitrate, ammonium thiosulfate and/or ammonium thiocyanate and, as the ionic solutions enter the reverse electrodialysis unit, the dilute ionic solution is 5 to 200° C. hotter than the concentrated ionic solution.

In another preferred embodiment, Y is at least 40 (e.g. 40 to 200), the concentrated ionic solution and the dilute ionic solution each independently comprise sodium bromide, sodium chlorate, sodium iodide, sodium nitrate, sodium nitrite, sodium formate, sodium acetate, sodium perchlorate, potassium fluoride, potassium iodide, potassium formate, potassium acetate, potassium carbonate, potassium nitrite, potassium thiocyanate, lithium nitrate, lithium nitrite, lithium acetate, ammonium formate, ammonium acetate, ammonium chloride, ammonium bromide, ammonium iodide, ammonium nitrate, ammonium thiosulfate and/or ammonium thiocyanate and, as the ionic solutions enter the reverse electrodialysis unit, the dilute ionic solution and the concentrated ionic solution have about the same temperature, i.e. differ less than 5° C. in temperature.

Preferably at least one, more preferably at least half, especially all of the membranes have an uneven surface profile comprising peaks and valleys. The average height difference between the peaks and valleys is preferably at least 50 μm, more preferably at least 75 μm.

When the membranes do not have an uneven surface comprising peaks and valleys it is preferred that the stack further comprises spacers which keep the cationic and anionic membranes apart, thereby creating a pathway between said membranes. Preferably the spacers are ion-conducting and keep the cationic and anionic create pathways of average width 50 to 400 μm, more preferably 100 to 250 μm.

Preferably at least one, more preferably at least half, especially all of the membranes have an electrical resistance below 1.5 ohm·cm², more preferably below 1.0 ohm·cm².

Preferably at least one, more preferably at least half, especially all of the membranes comprise a porous support and an ionically-charged polymeric layer present on the support. Such composite membranes are available from FUJIFILM Manufacturing Europe b.v.

Preferably at least one, more preferably at least half, especially all of the membranes have a thickness, including the support (when present) of less than 250 μm, more preferably between 10 and 200 μm, most preferably between 20 and 150 μm.

Preferably at least one, more preferably at least half, especially all of the membranes have an ion exchange capacity of at least 0.1 meq/g, more preferably of at least 0.3 meq/g, especially more than 0.6 meq/g, more especially more than 1.0 meq/g, based on the total dry weight of the membrane and any porous support and any porous strengthening material which remains in contact with the resultant membrane. Ion exchange capacity may be measured by titration as described by Djugolecki et al, J. of Membrane Science, 319 (2008) on page 217.

Preferably at least one, more preferably at least half, especially all of the membranes have a permselectivity for small cations (e.g. Na⁺ or Cl⁻) above 90%, more preferably above 95%. The permselectivity may be measured by the method described in WO201314420.

Preferably at least one, more preferably at least half, especially all of the membranes exhibit a swelling in water of less than 100%, more preferably less than 75%, most preferably less than 60%. The degree of swelling can be controlled by appropriate selection of the components used to prepare the membrane, e.g. the amount of crosslinker and/or the amount of non-curable compounds, and further by the properties of the porous support (when present).

Electrical resistance, permselectivity and % swelling in water may be measured by the methods described by Djugolecki et al, J. of Membrane Science, 319 (2008) on pages 217-218.

Typically the membranes are substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm.

The membranes preferably have low water permeability so that ions may pass through the membranes and water molecules do not pass through the membranes. Preferably at least one, more preferably at least half, especially all of the membranes have a water permeability lower than $1 \cdot 10^{-7}$ $m^3/m^2 \cdot s \cdot kPa$, more preferably lower than $1 \cdot 10^{-8}$ $m^3/m^2 \cdot s \cdot kPa$, most preferably lower than $5 \cdot 10^{-9}$ $m^3/m^2 \cdot s \cdot kPa$, especially lower than $1 \cdot 10^{-9}$ $m^3/m^2 \cdot s \cdot kPa$.

The porous supports which may be included in the membranes include woven and non-woven synthetic fabrics, e.g. polyethylene, polypropylene, polyacrylonitrile, polyvinyl chloride, polyester, polyamide, and copolymers thereof; and porous membranes based on, for example, polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof.

Various porous supports are available commercially, e.g. from Freudenberg Filtration Technologies (Novatexx materials) and Sefar AG.

Preferred cation exchange membranes comprise sulpho, carboxyl and/or phosphato groups, especially sulpho and/or carboxyl groups.

Preferred anion exchange membranes comprise quaternary ammonium groups.

Preferably at least one, more preferably at least half, especially all of the cation exchange membranes comprise an ionically-charged polymeric layer obtained from a curable composition comprising:
(i) 2.5 to 70 wt % crosslinker comprising at least two acrylamide groups;
(ii) 20 to 65 wt % curable ionic compound comprising one ethylenically unsaturated group and at least one anionic group;
(iii) 5 to 45 wt % solvent; and
(iv) 0 to 10 wt % of free radical initiator.

The crosslinker is preferably of the Formula (1):

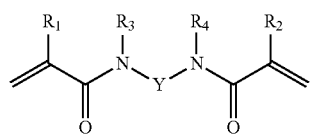

Formula (1)

wherein:
$R_1$ and $R_2$ are each independently H or methyl;
$R_3$ and $R_4$ are each independently H, alkyl, $R_3$ and $R_4$ together with the N groups to which they are attached and Y form an optionally substituted 6- or 7-membered ring; and
Y is an optionally substituted and optionally interrupted alkylene group.

When $R_3$ or $R_4$ is alkyl it is preferably $C_{1-4}$-alkyl.

When $R_3$ and $R_4$ together with the N groups to which they are attached and Y form an optionally substituted 6- or 7-membered ring they preferably form a piperazine, homopiperazine or triazine ring.

The optional interruptions which may be present in Y are preferably ether or, more preferably, amino groups. Y is preferably of the formula —$(C_nH_{2n})$— wherein n is 1, 2 or 3.

As examples of suitable crosslinkers there may be mentioned N,N'-methylene bis(meth) acrylamide, N,N'-ethylenebis(meth)acrylamide, N,N'-propylenebis(meth)acrylamide, N,N'-butylenebis(meth)acrylamide, N,N'-(1,2-dihydroxyethylene) bis-(meth)acrylamide, 1,4-diacryoyl piperazine, 1,4-bis(acryloyl)homopiperazine, triacryloyl-tris(2-aminoethyl)amine, triacroyl diethylene triamine, tetra acryloyl triethylene tetramine, 1,3,5-triacryloylhexahydro-1,3,5-triazine and/or 1,3,5-trimethacryloylhexahydro-1,3,5-triazine. The term '(meth)' is an abbreviation meaning that the 'meth' is optional, e.g. N,N'-methylene bis(meth) acrylamide is an abbreviation for N,N'-methylene bis acrylamide and N,N'-methylene bis methacrylamide.

Preferred curable ionic compounds comprise an acidic group, for example a sulpho, carboxy and/or phosphato group. Examples of curable ionic compounds include acrylic acid, beta carboxy ethyl acrylate, maleic acid, maleic acid anhydride, vinyl sulphonic acid, phosphonomethylated acrylamide, (2-carboxyethyl)acrylamide and 2-(meth)acrylamido-2-methylpropanesulfonic acid.

The solvent is preferable water or a mixture comprising water and an organic solvent, especially a water-miscible organic solvent.

When the solvent comprises water and an organic solvent the weight ratio of water:organic solvent is preferably higher than 2:3, more preferably between 10:1 and 1:1, more preferably between 10:1 and 1:2, especially between 4:1 and 1:1, and more especially between 3:1 and 2:1.

The organic solvent is optionally a single organic solvent or a combination of two or more organic solvents. Preferred organic solvents include $C_{1-4}$-alcohols (e.g. methanol, ethanol and propan-2-ol, diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), dimethyl formamide, acetone, N-methyl-2-pyrrolidinone and mixtures comprising two or more thereof. A particularly preferred organic solvent is propan-2-ol.

Preferably the composition comprises 0.01 to 10 wt %, more preferably 0.05 to 5 wt %, especially 0.1 to 2 wt % free radical initiator. The preferred free radical initiator is a photoinitiator. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

Preferably at least one, more preferably at least half, especially all of the anion exchange membranes comprise an ionically-charged polymeric layer obtained from a curable composition comprising:
(i) 2.5 to 70 wt % crosslinker comprising at least two acrylamide groups;
(ii) 12 to 65 wt % curable ionic compound comprising one ethylenically unsaturated group and at least one cationic group;
(iii) 10 to 70 wt % solvent; and
(iv) 0 to 10 wt % of free radical initiator.

The preferred crosslinker, solvent and radical initiator used to prepare the anion exchange membrane are as described above in relation to the cation exchange membrane.

Preferred curable ionic compounds comprise a quaternary ammonium group. Examples of such compounds include (3-acrylamidopropyl)trimethylammonium chloride, 3-methacrylamidopropyl trimethyl ammonium chloride, (ar-vinylbenzyl) trimethylammonium chloride, (2-(methacryloyloxy)ethyl)trimethylammonium chloride, [3-(methacryloylamino)propyl] trimethyl ammonium chloride, (2-acrylamido-2-methylpropyl) trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof.

Preferably the flow velocity of the ionic solutions through the pathways is less than 4 cm/s, more preferably less than 2 cm/s, especially less than 1.5 cm/s; the velocity may even be as low as 0.2, 0.4 or 0.6 cm/s. These preferences arise because higher flow velocities require more energy to pump the solutions, thereby reducing the efficiency of electricity generation. The flow velocity of the dilute ionic solution may be lower than, higher than or the same as the flow velocity of the concentrated solution.

According to a second aspect of the present invention there is provided a device for generating electricity comprising:
(A) a reverse electrodialysis unit comprising a membrane stack having electrodes, alternating cation and anion exchange membranes, a first pathway through the reverse electrodialysis unit for a concentrated ionic solution, and a second pathway through the reverse electrodialysis unit for a dilute ionic solution;
(B) a means for introducing a concentrated ionic solution into said first pathway;
(C) a means for introducing a dilute ionic solution into said second pathway, whereby solute from the concentrated solution in the first pathway passes through the membranes to the dilute solution in the second pathway, thereby generating electricity;
(D) optionally a means for heating the concentrated ionic solution to a temperature higher than that of the dilute ionic solution;
(E) a means for regenerating the concentrated and dilute ionic solutions from solutions exiting from the reverse electrodialysis unit; and
(F) a recycling means for recycling said regenerated concentrated and dilute solutions back to said first and second pathways in the reverse electrodialysis unit; wherein the concentration of solute in the dilute ionic solution as it enters the reverse electrodialysis unit is at least 0.03 mol/l.

Preferably the device further comprises a concentrated ionic solution and a dilute ionic solution, preferably such solutions being as hereinbefore described in relation to the first aspect of the present invention.

The means for introducing the ionic solutions into the pathways are typically inlets, e.g. pipes. The pathways through the electrodialysis unit typically comprise a cationic exchange membrane wall and an anionic exchange membrane wall. As ionic solutions pass along the pathways, ions migrate through the membrane walls from the concentrated ionic solution to the dilute ionic solution in order to bring the concentrations of the two ionic solutions closer together, thereby generating electricity. As a consequence, during the process the solute concentration of the dilute ionic solution increases and the solute concentration of the concentrated ionic solution decreases.

The means for heating the concentrated ionic solution to a temperature higher than the dilute ionic solution is not particularly limited. However to take full advantage of the present invention, one will preferably use an inexpensive means, for example a heating element which is heated by waste or unwanted heat, e.g. solar power, heat from a geothermal source or waste heat from a power station or cooling tower.

In one embodiment the heating element is heated by thermal energy obtained from a photovoltaic ("PV") power generation system. Since increased temperature has a deleterious effect on many PV power generation systems and requires cooling of solar cells, coupling the use of unwanted heat from such a system to drive efficient production of electricity creates a more efficient system.

Also, many large solar concentrated thermal power plants (CSP) that are operating at high temperature such as steam turbine-generators or Stirling engine generators, produce unwanted, waste heat at 40 to 90° C., which can be effectively and efficiently used to generate power by the present invention.

Any waste heat from industries (e.g. from power plants) or geothermal energy could also be utilized in the present process and device.

By utilizing waste energy (i.e., heat) produced through the operation of solar thermal or (concentrated) photovoltaic cell electricity-producing systems to increase the temperature of the concentrated ionic stream, some of the efficiency typically lost through the operation of solar thermal or photovoltaic cell electricity-producing systems can be recovered.

The means for regenerating the concentrated and dilute ionic solutions from solutions exiting from the reverse electrodialysis unit preferably comprises a heating element for evaporating liquid and optionally a cooling element for condensing evaporated liquid. The liquid typically is or comprises one or both of the solutions exiting the reverse electrodialysis unit. The cooling element, when present, optionally comprises recirculating water which cools vapour obtained from evaporating the aforementioned liquid.

The means for regenerating the concentrated and dilute ionic solutions from solutions exiting from the reverse electrodialysis unit preferably comprises a distillation unit which is capable of:
(i) evaporating liquid (e.g. water) from one or both of the solution(s) exiting the RED unit and condensing the evaporated liquid to give an ion-free liquid and a concentrate;
(ii) mixing of the ion-free liquid with one or both of the solution(s) exiting the RED unit, thereby regenerating the dilute ionic solution; and
(iii) mixing of the concentrate with one or both of the solution(s) exiting the RED unit, thereby regenerating the concentrated ionic solution.

If desired the reverse electro-dialysis device may comprise an integral heat exchange element. Likewise, a second heat transfer fluid may be cooled by heat exchange with ambient air or another cooler environment such as the subsurface soil.

In an alternative embodiment, the concentrated and dilute ionic solutions are regenerated using an electrodialysis (ED) device, for example by a process comprising separating at least a part of the dilute ionic solution and/or the concentrate ionic solution both exiting the reverse electrodialysis into a dilute and concentrate stream. Optionally the ED device uses an electrical field to force ions to flow from a dilute ionic solution to a more concentrated. Preferably the RED unit and the ED device each comprise membrane stacks and the membrane stacks present in the RED unit are different from the membrane stacks present in the ED device. In this embodiment it is preferred that for the regeneration step excess electricity is used, e.g. during periods that the production of electrical energy exceeds the demand. During periods that that the demand exceeds the production capacity the RED unit can be activated to produce additional electrical energy. Alternatively, excess energy may be stored and used to assist the regeneration step at a different point in time. The use of excess electricity in this way makes the method particularly flexible.

Non-limiting Examples of how the invention may be put into effect are described below.

EXAMPLES

A reverse electrodialysis unit was modified to include a means for heating the concentrate stream, the dilute stream or both. Cation and anion exchange membranes comprising a porous support and an ionically charged polymer were obtained from FUJIFILM Manufacturing Europe b.v.

The experimental investigation was carried out using the following lab-scale test-equipment using the method according to the first aspect of the present invention, except for the Comparative Example where the concentration of solute in the dilute ionic solution as it entered the reverse electrodialysis was lower than that required by the present invention. An RED unit was constructed from a conventional ED stack (obtained from Deukum GmH, Germany) with 10×10 cm$^2$ of membrane active area and co-current arrangement for feed solutions. All experiments were performed using 10 cell pairs per stack, Fujifilm ion exchange membranes and 300 μm polyamide woven spacers (from Deukum GmbH). The RED unit comprised electrode compartments containing two Ru—Ir mixed metal oxide electrodes (Magneto Special Anodes BV, The Netherlands) rinsed using an electrode rinse solution comprising 0.1 M $K_3Fe(CN)_6/K_4Fe(CN)_6$ aqueous solution (the "ERS") with 2.5 M NaCl as supporting electrolyte. Dilute and concentrated ionic solutions were pumped through the RED unit at a velocity of 1.0 cm/s using a two-housing peristaltic pump (Hosepump Masterflex US, Burt Process Equipment Inc., USA). An additional peristaltic pump (Hiedolph Pumpdrive 5006) was used for the ERS. All experimental measurements were carried out using an external load and using a Fluke 289 true-RMS Multimeter. The ERS, supporting electrolyte, dilute and concentrated ionic solutions were made using distilled water and the relevant salts of technical grade.

The dilute ionic solution and the concentrated ionic solution entered the RED unit at temperatures of 25° C.

The experimental procedure was based on the application of a variable external load to the RED unit, ranging approximately from 0 to 10Ω. For each load, both the electric current and the voltage at the end of each stack were measured using a multimeter. The electric power was afterwards evaluated through Ohm's law (P=E*I). Finally, the power density (PD) was calculated by normalising the electric power with respect to the cell pair area (PD=P/(N*A)), where P is electric power, N is the number of cell pairs, and A is the active membrane area in m$^2$.

Figure 2:
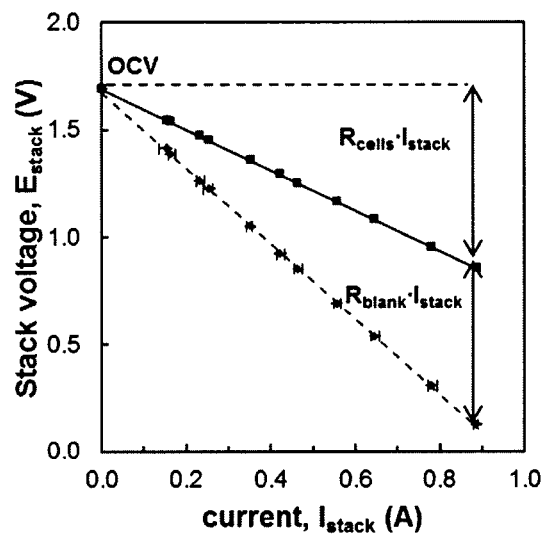
FIG. 2 illustrates a graph showing a correction method according to one embodiment of the present invention.

It is worth noting that, by definition, the power density was the power produced per cell pair area. On the other hand, the experimental values were also affected by the resistance of the electrode compartments ($R_{blank}$): this contribution, which is negligible for large stacks, may represent a significant percentage of the stack resistance for small RED unit. In order to estimate a power density not affected by the electrode compartments, representing large scale RED units, the following correction method was used (FIG. 2):

A 'corrected' voltage ($E_{corr}$) was obtained by applying Ohm's law: $E_{corr}$=OCV−$R_{cells}$*I, wherein OCV is the open circuit voltage, $R_{cells}$ is the cell resistance in Ohm and I is the electric current of the stack in Amps.

The 'corrected' power ($P_{corr}$) in W/m$^2$ per cell pair was calculated by the second Ohm's law: $P_{corr}$=$E_{corr}$*I wherein $E_{corr}$ and I are as hereinbefore defined.

The cell resistance ($R_{cells}$) was obtained by subtracting the blank resistance ($R_{blank}$) from the stack resistance ($R_{stack}$). The stack resistance ($R_{stack}$) was determined from the slope of the experimental data regression line (dotted line in the graph) on a plot of stack voltage ($E_{stack}$) against stack current ($I_{stack}$).

Examples Ex1 to Ex4 and Comparative Example CEx1

Comparative example CEx1 represents the case of river water and sea water, simulated by using sodium chloride concentrations of 0.017 M and 0.5 M respectively.

Examples Ex1 to Ex4 are experiments with higher concentrations of NaCl and $KNO_2$ showing the advantage of using solute streams from non-natural sources.

TABLE 2

Effect on $P_{corr}$ of varying Solute Identity and Concentration.

| | Solute | Concentration of dilute ionic solution (mol/l) | Concentration of concentrated ionic solution (mol/l) | $P_{corr}$ (W/m$^2$ per cell pair) |
|---|---|---|---|---|
| CEx1 | NaCl | 0.017 | 0.5 | 2.0 |
| Ex1 | NaCl | 0.05 | 5.0 | 7.6 |
| Ex2 | NaCl | 0.10 | 5.0 | 7.5 |
| Ex3 | $KNO_2$ | 0.05 | 5.0 | 9.6 |
| Ex4 | $KNO_2$ | 0.10 | 5.0 | 10.8 |

Comparative example CEx1 simulates the use of river water as dilute ionic solution (0.017 mol/l NaCl) and sea water as the concentrated ionic solution (0.5 mol/l NaCl).

Table 2 shows that power output ($P_{corr}$) can be improved by using higher solute concentrations for the ionic streams than is found in naturally occurring river water and/or sea water. Furthermore, Table 2 also shows that $P_{corr}$ can be improved by using solutes other than the sodium chloride found in natural water supplies.

The invention claimed is:
1. A method for generating electricity comprising the steps:
  (A) passing a concentrated ionic solution through a first pathway in a reverse electrodialysis unit comprising a membrane stack having electrodes and alternating cation and anion exchange membranes; and
  (B) passing a dilute ionic solution through a second pathway in said reverse electrodialysis unit, whereby solute from the concentrated solution in the first pathway passes through the membranes to the dilute solution in the second pathway, thereby generating electricity;
wherein:
  (i) the concentration of solute in the dilute ionic solution as it enters the reverse electrodialysis unit is at least 0.03 mol/l; and

(ii) the ionic solutions comprise water and a salt which has solubility in water at 20° C. of at least 8 mol/kg water.

2. The method according to claim 1 wherein the concentration of solute in the dilute ionic solution as it enters the reverse electrodialysis unit is at least 0.05 mol/l solvent.

3. The method according to claim 1 wherein the ionic solutions comprise water and a salt, wherein the salt comprises a cation selected from sodium, potassium, lithium, caesium, rubidium and/or ammonium and an anion selected from azide, bromide, carbonate, chloride, chlorate, fluoride, iodide, hydrogen carbonate, nitrate, nitrite, perchlorate, thiocyanate, thiosulphate, acetate and/or formate.

4. The method according to claim 1 wherein one or both of the ionic solutions comprise water and at least 0.02 mol/l of a solute other than sodium chloride.

5. The method according to claim 1 wherein the dilute and/or concentrated ionic solution comprises a water-miscible organic solvent.

6. The method according to claim 1 which further comprises the step (C) of regenerating the concentrated and dilute ionic solutions from the solutions exiting from the reverse electrodialysis unit and recycling said regenerated concentrated and dilute solutions back through said respective first and second pathways in the reverse electrodialysis unit.

7. The method according to claim 1 which is performed such that the following equation is satisfied:

$$S1/S2 > Y$$

wherein:
S1 is the concentration of solute in mol/l in the concentrated ionic solution as it enters the reverse electrodialysis unit;
S2 is the concentration of solute in mol/l in the dilute ionic solution as it enters the reverse electrodialysis unit; and
Y is at least 30.

8. The method according to claim 1 wherein the flow rate of the ionic solutions through the pathways is less than 4 cm/s.

9. The method according to claim 1 wherein:
(i) the concentration of solute in the dilute ionic solution as it enters the reverse electrodialysis unit is at least 0.05 mol/l solvent;
(ii) one or both of the ionic solutions comprise water and at least 0.02 mol/l of a solute other than sodium chloride;
(iii) the flow rate of the ionic solutions through the pathways is less than 4 cm/s; and
(iv) wherein the method is performed such that the following equation is satisfied:
wherein:
S1 is the concentration of solute in mol/l in the concentrated ionic solution as it enters the reverse electrodialysis unit;
S2 is the concentration of solute in mol/l in the dilute ionic solution as it enters the reverse electrodialysis unit; and
Y is at least 30.

10. The method according to claim 9 which further comprises the step (C) of regenerating the concentrated and dilute ionic solutions from the solutions exiting from the reverse electrodialysis unit and recycling said regenerated concentrated and dilute solutions back through said respective first and second pathways in the reverse electrodialysis unit.

11. The method according to claim 1 wherein at least half of the cation exchange membranes comprise an ionically-charged polymeric layer obtained from a curable composition comprising:
(i) 2.5 to 70 wt % crosslinker comprising at least two acrylamide groups;
(ii) 20 to 65 wt % curable ionic compound comprising one ethylenically unsaturated group and at least one anionic group;
(iii) 5 to 45 wt % solvent; and
(iv) 0 to 10 wt % of free radical initiator; and
wherein at least half of the anion exchange membranes comprise an ionically-charged polymeric layer obtained from a curable composition comprising:
(i) 2.5 to 70 wt % crosslinker comprising at least two acrylamide groups;
(ii) 12 to 65 wt % curable ionic compound comprising one ethylenically unsaturated group and at least one cationic group;
(iii) 10 to 70 wt % solvent; and
(iv) 0 to 10 wt % of free radical initiator.

* * * * *